US009059753B2

(12) United States Patent
Yang et al.

(10) Patent No.: US 9,059,753 B2
(45) Date of Patent: Jun. 16, 2015

(54) NON-CODEBOOK BASED CHANNEL STATE INFORMATION FEEDBACK (71) Applicant: Nokia Siemens Networks Oy, Espoo (FI)

(72) Inventors: Weidong Yang, Hoffman Estates, IL (US); Timo Erkki Lunttila, Espoo (FI); Xiao Yi Wang, Beijing (CN)

(73) Assignee: Nokia Solutions & Networks Oy, Espoo (FI)

( * ) Notice: Subject to any disclaimer, the term of this patent is extended or adjusted under 35 U.S.C. 154(b) by 0 days.

(21) Appl. No.: 13/628,239

(22) Filed: Sep. 27, 2012

(65) Prior Publication Data
US 2014/0086285 A1 Mar. 27, 2014

(51) Int. Cl.
H04B 7/02 (2006.01)
H04L 1/02 (2006.01)
H04B 7/04 (2006.01)
H04B 7/06 (2006.01)

(52) U.S. Cl.
CPC ............ *H04B 7/0417* (2013.01); *H04B 7/0632* (2013.01); *H04B 7/0634* (2013.01); *H04B 7/0639* (2013.01); *H04B 7/061* (2013.01); *H04B 7/0691* (2013.01)

(58) Field of Classification Search
CPC .. H04B 7/0417; H04B 7/0639; H04L 5/0053; H04L 5/0023; B62D 15/027
USPC .......................... 375/267; 370/330, 252, 335
See application file for complete search history.

(56) References Cited

U.S. PATENT DOCUMENTS

| 2010/0189002 | A1* | 7/2010 | Choi et al. ..................... 370/252 |
| 2010/0195615 | A1* | 8/2010 | Lee et al. ...................... 370/330 |
| 2010/0303034 | A1 | 12/2010 | Chen et al. |
| 2010/0323684 | A1 | 12/2010 | Cai et al. |
| 2011/0032839 | A1* | 2/2011 | Chen et al. .................... 370/252 |
| 2011/0080969 | A1* | 4/2011 | Jongren et al. ................ 375/267 |
| 2012/0033630 | A1 | 2/2012 | Chung et al. |
| 2012/0188962 | A1* | 7/2012 | Gao et al. ...................... 370/329 |
| 2013/0044727 | A1* | 2/2013 | Nory et al. .................... 370/330 |

OTHER PUBLICATIONS

3GPP TS 36.211 V11.0.0 (Sep. 2012) 3rd Generation Partnership Project; Technical Specification Group Radio Access Network; Evolved Universal Terrestrial Radio Access (E-UTRA); Physical Channels and Modulation (Release 11) (106 pages).
3GPP; "3GPP TS 36.211 V10.5.0 (Jun. 2012); 3rd Generation Partnership Project; Technical Specification Group Radio Access Network; Evolved Universal Terrestrial Radio Access (E-UTRA); Physical Channels and Modulation (Release 10)"; Jun. 2012; whole document (101 pages).
3GPP; "3GPP TS 36.213 V10.6.0 (Jun. 2012); 3rd Generation Partnership Project; Technical Specification Group Radio Access Network; Evolved Universal Terrestrial Radio Access (E-UTRA); Physical layer procedures (Release 10)"; Jun. 2012; whole document (125 pages).

* cited by examiner

*Primary Examiner* — Sam K Ahn
*Assistant Examiner* — Fabricio R Murillo Garcia
(74) *Attorney, Agent, or Firm* — Harrington & Smith (57) ABSTRACT

The specification and drawings present a new method, apparatus and software related product for using non-codebook based CSI feedback (e.g., in LTE wireless systems) using selection by a UE of one or more of the plurality of logical antenna ports based on a predefined procedure (e.g., SNR or SINR measurement), but without selecting any codeword (precoder) by the UE. This allows not to involve any standardization of codebooks for precoding due to reliance on an alternative CSI feedback framework which does not rely on standardized codebooks. The exemplary embodiments described herein aim at development of 3GPP LTE Release-12.

20 Claims, 4 Drawing Sheets

NON-CODEBOOK BASED CHANNEL STATE INFORMATION FEEDBACK

TECHNICAL FIELD

The exemplary and non-limiting embodiments of this invention relate generally to wireless communications and more specifically to using non-codebook based channel state information feedback (e.g., in LTE wireless systems).

BACKGROUND ART

The following abbreviations that may be found in the specification and/or the drawing figures are defined as follows:
3GPP third generation partnership project
BLER block error rate
CDM code division multiplex(ed/ing)
CoMP coordinated multi-point
CQI channel quality indicator
CRS common (cell-specific) reference signal
CSI channel state information
CSI-RS channel state information reference signal
DL downlink
DM RS demodulation reference signal (user specific)
EPDCCH enhanced Physical Downlink Control Channel
E-UTRA evolved universal terrestrial radio access
eNB, eNodeB evolved node B/base station in an E-UTRAN system
E-UTRAN Evolved UTRAN (LTE)
HARQ hybrid automatic repeat request
LTE long term evolution
LTE-A long term evolution advanced
MCS modulation and coding scheme
MIMO multiple input multiple output
MU multi user
PRB physical resource block
PDCCH physical downlink control channel
PDSCH physical downlink shared channel
PUCCH physical uplink control channel
PUSCH physical uplink shared channel
PMI precoding matrix indicator
PMI-RS precoding matrix indicator reference signal (precoded RS for PMI selection)
RAN radio access network
RI rank index
RRC radio resource control
SIB system information block
SNR signal-to-noise ratio
SINR signal to interference plus noise ratio
TB transport block
TBS transport block size
TDD time division duplexing
TTI transmission time interval
UE user equipment
UL uplink
UTRAN universal terrestrial radio access network
WG working group Multi-antenna MIMO techniques such as closed loop precoding and CoMP have received a lot of attention in the 3GPP for many years. A key design aspect in all closed loop MIMO related features is the channel state information (CSI) feedback consisting of one or more of CQI, PMI and RI and provided by the UE that helps the eNodeB in selecting the transmission parameters so that the data throughput is maximized.

The core part of any DL MIMO enhancements has been the precoding codebook design and the corresponding feedback signaling provided to the eNodeB by the UE. A codebook contains a set of precoding matrices that define the eNodeB antenna coefficients weights. Based on the DL reference signals such as CRS or CSI-RS the UE can identify the precoder from a given codebook (i.e., set of eNodeB antenna weights) that would maximize the signal quality and consequently the data throughput. The index of the precoder matrix (PMI) is fed back from the UE to the eNB as a recommendation for the precoder.

Moreover, DL MU-MIMO receives a considerable interest and will also be at the core of UE feedback enhancements: one key issue currently under consideration is how to design efficient and unified UE feedback in support of both DL SU- and MU-MIMO which are likely to be intrinsically tied together within the same DL transmission mode. When aiming at improving the system performance in LTE 3GPP Releases, the accuracy and granularity of the codebook and its suitability to the scenario of interest tends to become key issues in the discussions.

The problem related to codebook standardization is that the optimal codebook depends on the scenario, i.e., eNodeB antenna configuration. The factors impacting the optimal codebook design and the applicability of the codebook to different scenarios include at least the following considerations:
  a number of eNodeB transmit antennas (e.g. 2, 4, 8 . . . ),
  spacing between antenna elements (closely spaced, correlated antennas vs., e.g., distributed antenna systems),
  polarity of the antennas (linear or cross-polarization), and
  layout of the antenna configurations (uniform linear array, circular array, etc.).

Recently there has been increasing discussion on new scenarios where the existing codebooks appear to be rather sub-optimal including:
  distributed antenna systems, where the spacing between some of the antennas may be significant,
  massive MIMO where the number of antennas could be 16 or more,
  vertical beamforming, where the precoding targets in addition to horizontal domain are also the vertical components, etc.

A variety of deployment scenarios makes codebook standardization very difficult, since as discussed herein, the optimal codebook for one scenario may turn out to be a sub-optimal one for another scenario. The experience from the 3GPP standardization is that codebook standardization is very time consuming exercise that tends to lead to compromises that are not fully optimized for any scenario.

Besides, codebook based feedback results in a fixed granularity of CSI knowledge at the eNodeB side, since the UE can only select the recommended precoder (PMI) from a given codebook. That again makes it difficult to fit the CSI feedback to different types of environments. For example, in a typical flat radio environment a rough granularity is sufficient, while in an environment with rich multipath, a high granularity is needed. With a fixed size, the codebook cannot really result in a variable granularity and fit to different scenarios.

On the other hand, the LTE MIMO operation has been lately developing in the direction where UE specific demodulation reference signals (DM RS) are heavily utilized. With the DM RS the precoding that the eNodeB utilizes is transparent to the UE. The precoder that the eNodeB can use does not need to be signaled to the UE, instead the eNodeB may choose the antenna weights whatever the way it likes. The codebook is just for the purpose of the CSI feedback as a UE recommendation to the eNodeB. However, in practice the eNodeB has usually no other information to base the precoder selection on and hence it needs to settle for selecting the precoder from a standardized codebook, which may well be suboptimal.

In LTE 3GPP Release 10 downloadable codebooks were proposed by some companies. The core idea is that the eNodeB could configure any codebook for the UE to generate PMI/RI/CQI (e.g., there could be several standardized codebooks and the eNodeB would signal an indication of which one the UE should assume). The intention is to optimize the MIMO performance by using different codebooks for different scenarios. However, such proposal was not accepted in the 3GPP for Release.10. The main drawbacks are as follows:
1. UE PMI selection implementation must be flexible enough to allow all kind of codebooks configured by the eNodeB, which requires additional complexity;
2. Codebook configuration error reduces the robustness of the scheme;
3. Multiple scenarios result in a large number of codebooks to design thus requiring significant standardization effort.

SUMMARY

According to a first aspect of the invention, a method comprising: sending, by a network element to a user equipment for a channel state information feedback, precoded reference signals corresponding to a plurality of logical antenna ports with one precoding codeword for each of the plurality of logical antenna ports; receiving by the network element from the user equipment a report comprising information on selected one or more of the plurality of logical antenna ports, the information comprising one or more of indices of the selected one or more of the plurality of logical antenna ports and corresponding one or more channel quality indicators for the selected one or more of the plurality of logical antenna ports, and sending data by the network element to the user equipment using the selected one or more of the plurality of logical antenna ports and the corresponding one precoding codeword for each of the selected one or more of the plurality of logical antenna ports.

According to a second aspect of the invention, a method comprising: receiving from a network element by a user equipment, for providing a channel state information feedback, precoded reference signals corresponding to a plurality of logical antenna ports; selecting by the user equipment one or more of the plurality of logical antenna ports based on a predefined procedure; and sending by the user equipment to the network element a report comprising information on selected one or more of the plurality of logical antenna ports, the information comprising one or more of indices of the selected one or more of the plurality of logical antenna ports and corresponding one or more channel quality indicators for the selected one or more of the plurality of logical antenna ports.

According to a third aspect of the invention, an apparatus comprising: a processing system comprising at least one processor and a memory storing a set of computer instructions, in which the processing system is arranged to cause the apparatus to: send, to a user equipment for a channel state information feedback, precoded reference signals corresponding to a plurality of logical antenna ports with one precoding codeword for each of the plurality of logical antenna ports; receive from the user equipment a report comprising information on selected one or more of the plurality of logical antenna ports, the information comprising one or more of indices of the selected one or more of the plurality of logical antenna ports and corresponding one or more channel quality indicators for the selected one or more of the plurality of logical antenna ports, and send data to the user equipment using the selected one or more of the plurality of logical antenna ports and the corresponding one precoding codeword for each of the selected one or more of the plurality of logical antenna ports.

According to a fourth aspect of the invention, an apparatus comprising: a processing system comprising at least one processor and a memory storing a set of computer instructions, in which the processing system is arranged to cause the apparatus to: receive from a network element, for providing a channel state information feedback, precoded reference signals corresponding to a plurality of logical antenna ports; select one or more of the plurality of logical antenna ports based on a predefined procedure; and send to the network element a report comprising information on selected one or more of the plurality of logical antenna ports, the information comprising one or more of indices of the selected one or more of the plurality of logical antenna ports and corresponding one or more channel quality indicators for the selected one or more of the plurality of logical antenna ports.

BRIEF DESCRIPTION OF THE DRAWINGS

For a better understanding of the nature and objects of embodiments of the invention, reference is made to the following detailed description taken in conjunction with the following drawings, in which.

DETAILED DESCRIPTION

A new method, apparatus, and software related product (e.g., a computer readable memory) are presented for using non-codebook based CSI feedback (e.g., in LTE wireless systems) using selection by a UE of one or more of the plurality of logical antenna ports based on a predefined procedure (e.g., SNR or SINR measurement), but without selecting any codeword (precoder) by the UE. This allows not to involve any standardization of codebooks for precoding due to reliance on an alternative CSI feedback framework which does not rely on standardized codebooks. The exemplary embodiments described herein aim at development of 3GPP LTE Release-12.

According to an embodiment of the invention, a network element (e.g., eNB) may send to a UE for a CSI feedback precoded reference signal/signals (PRS) such as precoding matrix indicator reference signal or signals (PMI-RS) corresponding to a plurality of logical antenna ports with one codeword (assigned by the eNB) for each of the plurality of logical antenna ports, and an indication of indices of a plurality of logical antenna ports, each index of these indices corresponding to one or more of the plurality of logical antenna ports. These reference signal/signals are referred in the following as PMI-RS.

In response, the UE may select one or more of the plurality of logical antenna ports based on a predefined procedure, e.g., based on signal-to-noise ratio (SNR) or signal to interference plus noise ratio (SINR) measurements but without selecting any codeword (precoder), so that the UE may send the selection to the network element. Thus, the network element can receive from the UE a report (or feedback report) comprising information on selected one or more of the plurality of logical antenna ports selected/chosen by the user equipment, the information comprising one or more of the indices and corresponding one or more channel quality indicators for the selected one or more of the plurality of logical antenna ports.

Based on the received feedback CQI information (comprised in the report from the UE), the network element can further use the selected logical antenna port information (using the one codeword assigned by the eNB for each of the selected one or more of the plurality of logical antenna ports) for transmitting data to the UE (e.g., on PDSCH) to maximize the channel throughput.

Moreover, according to exemplary embodiments, a non-codebook based CSI feedback framework described herein may comprise the following components.

In a downlink (DL) part, the network element such as eNB can transmit several precoded reference signals (RSs) for CSI feedback purposes. The PMI-RS ports may correspond to, e.g., CSI-RS antenna ports, i.e., there is no need to define new physical DL reference signals. Each PMI-RS port may correspond to a precoder, i.e., a beam.

Suppose there are M physical antennas at the eNB, and N logical antenna ports (PMI-RS port) defined for the CSI feedback. Then for a PMI-RS port i, where $i = 1, \ldots, N$, we may have a M×1 vector $W_i$ applied to the M physical antenna ports. ($W_i$ is the precoder of the PMI-RS port i). The eNB may select precoders for the PMI-RS ports (logical antenna ports), which will be completely transparent to the UEs. According to the embodiment described herein, no need to restrict $W_i$ to any existing (standardized) codebook. Therefore, generally the network element (eNB) can use new codewords (new precoding codewords), codewords (precoding codewords) from the Release 10 codebook (conventional codebook) or codebook(s) introduced in later 3GPP releases.

Furthermore, the eNB can also indicate to the UE (e.g., configured with RRC signaling) the indices of the PMI-RSs ports that the UE should monitor. The indices may correspond, for example, to CSI-RS configuration/port numbering, as it further illustrated in exemplary embodiments described herein (e.g., see Tables 1 and 2).

In an uplink (UL) part, in response to the PMI-RS, the basic UE procedure may be as follows:
1. The UE can measure all configured PMI-RSs ports,
2. The UE may select the preferred PMI-RS port or PMI-RS port combination(s), and
3. The UE can feed back the selected index or indices of the PMI-RS port(s) to the eNB.

It is noted that the PMI-RS port selection according to the embodiment described herein may correspond to a conventional PMI selection. For example, the UE can assume that the precoder applied for the PMI-RS is also applied for a PDSCH and then select the PMI-RS port resulting in largest PDSCH throughput using a predefined procedure. For example, the logical antenna port (or PMI-RS port) selection can be based on selecting the PMI-RS port(s) with highest SINR or SNR. Moreover, each PMI-RS port may correspond to one PDSCH stream, and the UE may select more than one PMI-RS port (e.g., a predefined PMI-RS combination) if the UE prefers to have multi-layer transmission, i.e., having a rank of more than one 1.

Thus, the UE can feed back the indices of selected PMI-RS(s) ports as an indication of the preferred precoder (since the eNB knows the precoder used for each PMI-RS). The index could correspond to one PMI-RS port or a combination of multiple PMI-RS ports and the indexing is configured by the eNB beforehand as described above.

Furthermore, the UE also can derive the CQI (i.e., supported by MCS/TBS) based on the selected PMI-RS port or ports. In case the rank>1, the UE may feedback more than one CQIs (e.g., two CQIs for the rank=2, three CQIs for the rank=3, etc.), one for each transport block. In other words, in general, the rank may be equal to n, where n is a finite integer of one or more. If the UE selects multiple PMI-RS ports (with rank>1), the CQI calculation may consider the inter-stream interference (based on the mutual interference between selected PMI-RS ports). Then the CQI which can be fed back by the UE to the eNB is associated with the index/indices of the selected PMI-RS port(s). This way the existing CSI feedback framework can be reused to a large extent while making it completely independent of the codebook design. Further examples are presented herein illustrate different implementation aspects.

Figure 1:
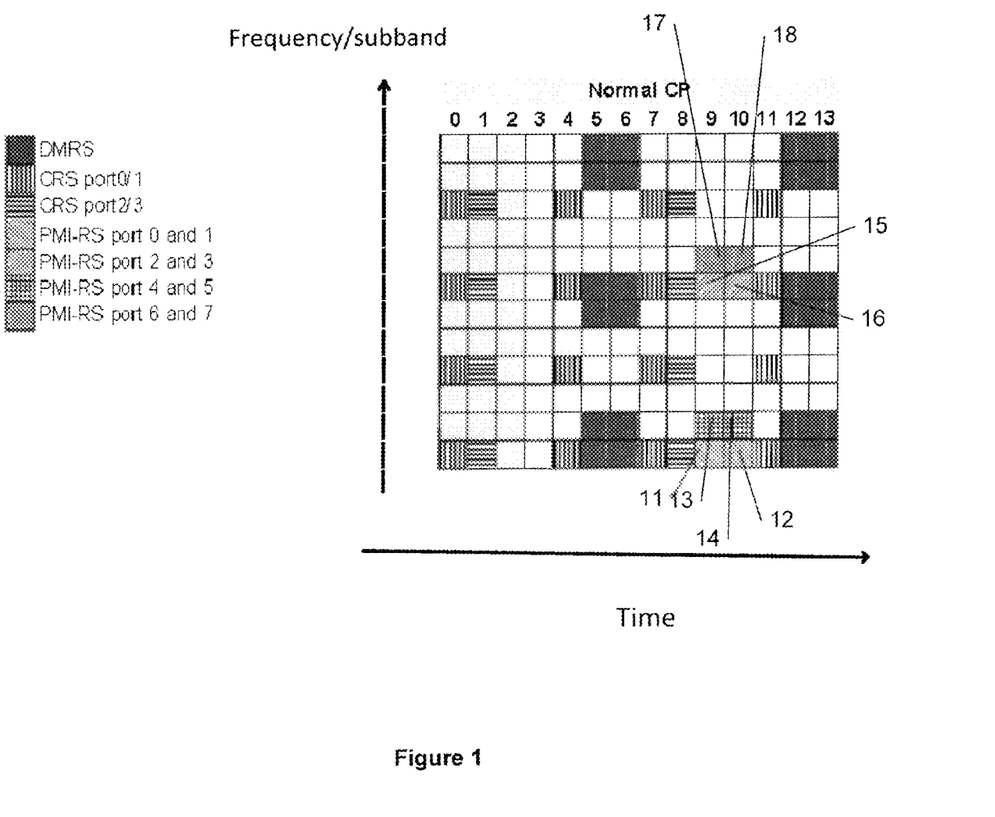
FIG. 1 is a diagram in a frequency-time domain demonstrating RE mapping of PMI-RS port in one PRB pair, according to an exemplary embodiment of the invention.

According to exemplary embodiments presented herein, the PMI-RS is a new reference signal, but it can follow the design of some existing reference signal such as CSI-RS. FIG. 1 shows an example of PMI-RS (logical antenna) ports mapping to REs in the same manner as the mapping of CSI-RS ports: pairs of the PMI-RS ports are multiplexed together using a CDM code across two REs adjacent in time domain. The PMI-RS port mapping has the same pattern as the CSI-RS and in the present example eight PMI-RSs 11, 12, 13, 14, 15, 16, 17 and 18 are assigned to correspond to eight eNB specific precoding vectors.

A further implementation is discussed in the following assuming that the eNodeB comprises 4 transmit antennas and the UE comprises 2 receivers and capable of a dual layer reception. First, the eNodeB may configure 8 PMI-RSs for the UE to measure, and transmit 8 PMI-RSs to the UE, each PMI-RS having a different precoder selected by eNodeB as described herein. Also two PMI-RS index mapping tables corresponding to rank 1 and rank 2 may be configured separately for the UE by the network element (eNB) as illustrated in Tables 1 and 2, and signaled by the eNB to the UE, e.g., using RRC signaling. Table 1 is for rank=1, where each of indices 1-8 correspond to a unique one of the PMI-RS ports 1-8 (this requires 3 bits for each port). Table 2 is for rank=2, where each of indices 1-8 correspond to RS port combinations [1,3], [2,4], [5,7], [6,8], [1,7], [2,8], [5,3] and [6,4], respectively. It is further noted that the rank of indices may be more than two. For example, rank=3 implies that each index corresponds to a combination of 3 logical antenna ports, rank=4 implies that each index corresponds to a combination of 4 logical antenna ports, etc. Also the table(s) configured by the network element for the UE may have "mixed" rank having indices of different ranks. This is demonstrated in Table 3 below where indices 1-4 have a first rank and indices 5-8 have a second rank.

In another embodiment, tables as discussed herein and shown for example as Tables 1-3 below can be agreed upon between the network and UEs using different means.

First, the table can be explicitly built and documented in the specification(s) such as 3GPP TS 36.211/36.213. In other words, the table can be agreed upon between the network and UEs according to the specification. Also, the indices may be implicitly derived through an analytical expression (the procedure should be known to both the network element and the UE). In one example, the combinatorial formulas as in the best M CSI feedback scheme may be used. Then for all LTE-selected PMI-RS ports (logical antenna ports) the UE can report the indices of the M selected PMI-RS ports using a combinatorial index r defined as $$r = \sum_{i=0}^{M-1} \binom{N - s_i}{M - i},$$

where the set $\{s_i\}_{i=0}^{M-1}$, ($1 \leq s_i \leq N$, $s_i < s_{i+1}$) contains the M sorted PMI-RS port indices and $$\binom{x}{y} = \begin{cases} \binom{x}{y} & x \geq y \\ 0 & x < y \end{cases}$$

is the extended binomial coefficient, resulting in unique label $$r \in \left\{0, \ldots, \binom{N}{M} - 1\right\}.$$

Alternatively the table can be signalled by the network element (eNB) to the UE(s) through RRC signalling, as discussed herein, which can take the form of SIB message, dedicated RRC signalling, or a combination of both.

TABLE 1

An example of eNB configured PMI-RS port indexing with Rank = 1

| PMI index (for feedback) | PMI-RS index |
|---|---|
| Index 1 | PMI-RS port 1 |
| Index 2 | PMI-RS port 2 |
| ... | ... |
| Index8 | PMI-RS port 8 |

TABLE 2

An example of eNB configured PMI-RS port indexing with Rank = 2

| PMI index (for feedback) | PMI-RS index |
|---|---|
| Index1 | PMI-RS port 1 and 3 |
| Index2 | PMI-RS port 2 and 4 |
| Index3 | PMI-RS port 5 and 7 |
| Index4 | PMI-RS port 6 and 8 |
| Index5 | PMI-RS port 1 and 7 |
| Index6 | PMI-RS port 2 and 8 |
| Index7 | PMI-RS port 5 and 3 |
| Index8 | PMI-RS port 6 and 4 |

TABLE 3

An example of eNB configured PMI-RS port indexing with Rank = 1 and Rank = 2

| PMI index (for feedback) | PMI-RS index |
|---|---|
| Index1 | PMI-RS port 1 |
| Index2 | PMI-RS port 2 |
| Index3 | PMI-RS port 3 |
| Index4 | PMI-RS port 4 |
| Index5 | PMI-RS port 1 and 3 |
| Index6 | PMI-RS port 2 and 4 |
| Index7 | PMI-RS port 1 and 2 |
| Index8 | PMI-RS port 3 and 4 |

Then the UE may derive/select PMI-RS (logical antenna) port(s)/rank. The UE can measure all the configured RS ports and select the preferred PMI-RS port or port combination. The port selection is jointly fed back together with the corresponding CQI(s). Only 3 bits may be needed for the PMI-RS port feedback in this example.

According to the last reported RI (indicating a number of selected logical antenna ports), the UE can use corresponding table to select the preferred PMI-RS port or port combination (according to the rank). The selected rank may be fed back in a separate feedback message (similarly as in the current LTE specifications).

According to a further embodiment, the feedback report may be sent by the UE (and received by the eNB) using one message or alternatively multiple messages/reports from the UE, wherein each report may be dedicated, e.g., to information related to only one selected port.

It is further noted that the above example is a non-limiting example, and the number of PMI-RS resources may be larger or smaller than 8. Adjusting the number of PMI-RS resources may allow the eNB to trade-off between precoder granularity and DL (PMI-RS) and/or UL (feedback) overhead. Nevertheless, it is straight forward to utilize the current UL feedback signaling formats by using embodiments of described herein by simply varying the size of the PMI field.

It is further noted that the 3GPP RAN WG4 defines a CQI/PMI test case which can be realized in a similar way as in a conventional approach including the following elements (this is just an example clarifying that the embodiments described herein are feasible also in a sense that a test procedure verifying correct UE operation can be also defined):The precoder of the selected PMI-RS port(s) may be used to precode PDSCH, The eNB may select the MCS based on the reported CQI, and The eNB can perform tests whether the BLER is on target (e.g., below 10%).

Advantages of a novel approach described in various embodiments described herein may include (but are not limited to):

1. Flexible CSI granularity adjustment, so that the eNB may have the flexibility in configuring the number of PMI-RS ports to achieve fine or coarse CSI granularity providing the best tradeoff between PMI-RS and feedback overhead and MIMO performance;

2. Ability to customize MIMO feedback for different scenarios such as:
   a) The eNB may select the precoder for each PMI-RS port freely in an optimal way without having to restrict itself to any standardized codebook,
   b) The UE does not need to try different precoders for each RS port, instead, simple SNR or SINR measurements may be sufficient, resulting in low implementation complexity;

3. The described embodiments are compatible with the current PMI/RI/CQI feedback framework so that:
   a) The index of selected PMI-RS port or port combination is corresponding to the PMI/RI feedback,
   b) The CQI is associated with the index of the selected PMI-RS port.

Figure 2:
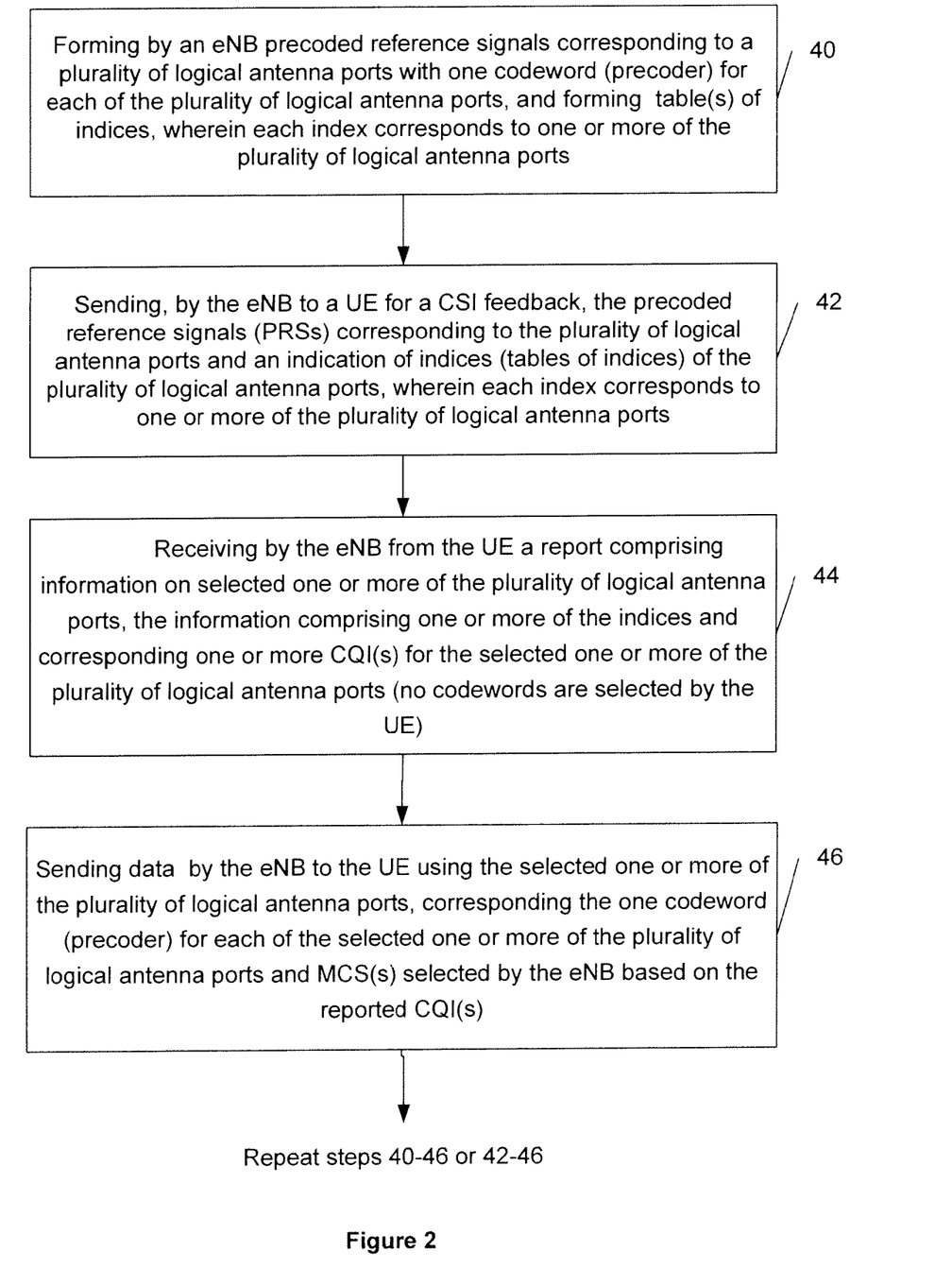
FIG. 2 is a flow chart demonstrating exemplary embodiments of the invention performed by an eNB.

FIG. 2 shows an exemplary flow chart demonstrating implementation of embodiments of the invention by a network element (e.g., eNB). It is noted that the order of steps shown in FIG. 2 is not absolutely required, so in principle, the various steps may be performed out of the illustrated order. Also certain steps may be skipped, different steps may be added or substituted, or selected steps or groups of steps may be performed in a separate application.

In a method according to the exemplary embodiment shown in FIG. 2, in a first step 40, the network element (eNB) forms precoded reference signals each corresponding to a plurality of logical antenna ports with one codeword (precoder) for each of the plurality of logical antenna ports, and further forms table(s) of indices (e.g., see Tables 1 and 2 for ranks 1 and 2), wherein each index corresponds to one or more of the plurality of logical antenna ports. In a next step 42, the network element (eNB) sends to a UE for a CSI feedback, the precoded reference signals corresponding to the plurality of logical antenna ports and an indication of indices (i.e., tables of indices formed in step 40) of the plurality of logical antenna ports, wherein each index corresponds to one or more of the plurality of logical antenna ports.

In a next step 44, the network element (eNB) receives from the UE a report comprising information on selected one or more of the plurality of logical antenna ports, the information comprising one or more of the indices and corresponding one or more channel quality indicators for the selected one or more of the plurality of logical antenna ports (but no codewords are selected/reported by the UE).

In a next step 46, the network element (eNB) sends data to the UE using the selected one or more of the plurality of logical antenna ports, corresponding the one codeword (precoder, selected by the eNB in step 40) and MCS(s) selected by the eNB based on the reported CQI(s) for each of the selected one or more of the plurality of logical antenna ports.

It is further noted that according to a further embodiment, steps 42-46 or 40-46 can be repeated, e.g., using a predefined time period.

Figure 3:
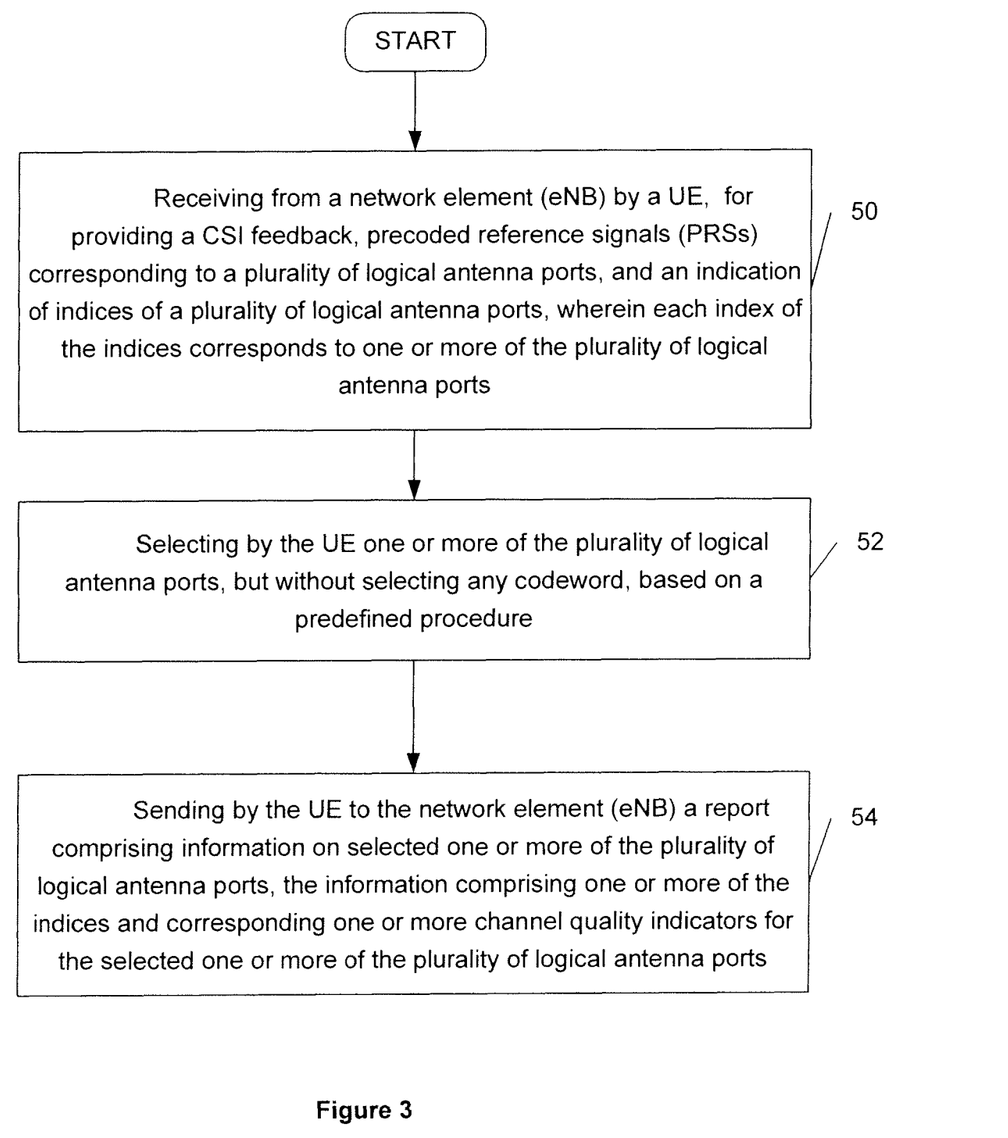
FIG. 3 is a flow chart demonstrating exemplary embodiments of the invention performed by a UE.

FIG. 3 shows an exemplary flow chart demonstrating implementation of embodiments of the invention by a UE. It is noted that the order of steps shown in FIG. 3 is not absolutely required, so in principle, the various steps may be performed out of the illustrated order. Also certain steps may be skipped, different steps may be added or substituted, or selected steps or groups of steps may be performed in a separate application.

In a method according to the exemplary embodiment shown in FIG. 3, in a first step 50, the UE receives from a network element such as eNB (for providing a CSI feedback)-a precoded reference signals each corresponding to a plurality of logical antenna ports, and an indication of indices (e.g., see Tables 1 and 2 for ranks 1 and 2) of a plurality of logical antenna ports, wherein each index of the indices corresponds to one or more of the plurality of logical antenna ports.

In a next step 52, the UE selects one or more of the plurality of logical antenna ports, but without selecting any codeword, based on a predefined procedure (e.g., based on SNR or SINR measurements). In a next step 54, the UE sends to the network element (eNB) a report comprising information on selected one or more of the plurality of logical antenna ports, the information comprising one or more of the indices and corresponding one or more channel quality indicators for the selected one or more of the plurality of logical antenna ports.

Figure 4:
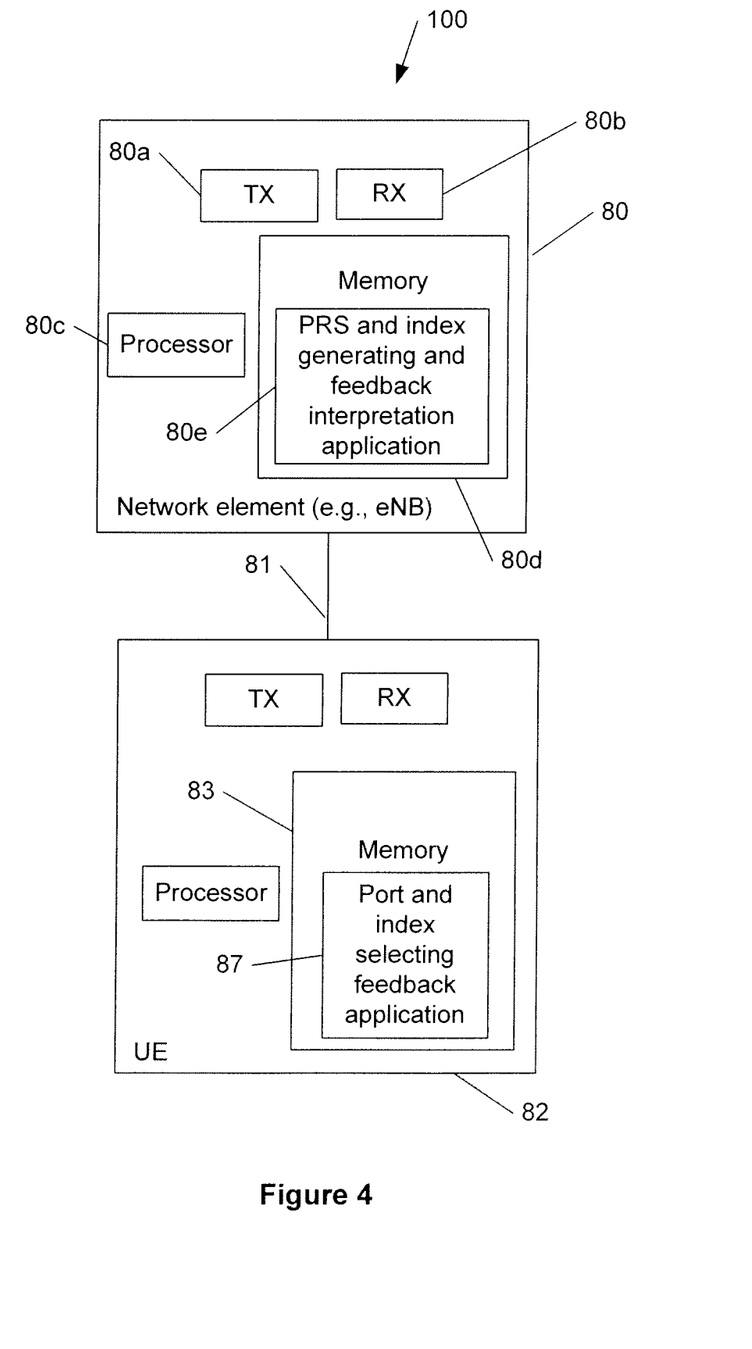
FIG. 4 is a block diagram of LTE wireless devices for practicing exemplary embodiments of the invention.

FIG. 4 shows an example of a block diagram demonstrating LTE devices including a network element (e.g., eNB) 80 comprised in a network 100, and a UE 82 communicating with the eNB 80, according to an embodiment of the invention. FIG. 4 is a simplified block diagram of various electronic devices that are suitable for practicing the exemplary embodiments of this invention, and a specific manner in which components of an electronic device are configured to cause that electronic device to operate. The UE 82 may be a mobile phone, a camera mobile phone, a wireless video phone, a portable device or a wireless computer, etc.

The eNB 80 may comprise, e.g., at least one transmitter 80a, at least one receiver 80b, at least one processor 80c at least one memory 80d and a PRS and index generating and feedback interpretation application module 80e. The transmitter 80a and the receiver 80b may be configured to provide a wireless communication with the UE 82 (and others not shown in FIG. 4), e.g., through a corresponding link 81, according to the embodiments of the invention. The transmitter 80a and the receiver 80b may be generally means for transmitting/receiving and may be implemented as a transceiver, or a structural equivalence thereof. It is further noted that the same requirements and considerations are applied to transmitter and receiver of the UE 82.

Various embodiments of the at least one memory 80d (e.g., computer readable memory) may include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the processor 80c include but are not limited to general purpose computers, special purpose computers, microprocessors, digital signal processors (DSPs) and multi-core processors. Similar embodiments are applicable to memories and processors in other wireless devices such as UE 82 shown in FIG. 4.

The PRS and index generating and feedback interpretation application module 80e may provide various instructions for performing steps 40-46 shown in FIG. 2. The module 80e may be implemented as an application computer program stored in the memory 80d, but in general it may be implemented as software, firmware and/or hardware module or a combination thereof. In particular, in the case of software or firmware, one embodiment may be implemented using a software related product such as a computer readable memory (e.g., non-transitory computer readable memory), computer readable medium or a computer readable storage structure comprising computer readable instructions (e.g., program instructions) using a computer program code (i.e., the software or firmware) thereon to be executed by a computer processor. Furthermore, the module 80e may be implemented as a separate block or may be combined with any other module/block of the device 80, or it may be split into several blocks according to their functionality.

The UE 82 may have similar components as the eNB 80, as shown in FIG. 4, so that the above discussion about components of the eNB 80 is fully applicable to the components of the UE 82.

A port and index selecting feedback application module 87 in the UEs 82 may provide various instructions for performing steps 50-54 shown in FIG. 3. The module 87 may be implemented as an application computer program stored in the memory 83 of UE, but in general it may be implemented as software, firmware and/or hardware module or a combination thereof. In particular, in the case of software or firmware, one embodiment may be implemented using a software related product such as a computer readable memory (e.g., non-transitory computer readable memory), computer readable medium or a computer readable storage structure comprising computer readable instructions (e.g., program instructions) using a computer program code (i.e., the software or firmware) thereon to be executed by a computer processor. Furthermore, the module 87 may be implemented as a separate block or may be combined with any other module/block of the device 82, or it may be split into several blocks according to their functionality.

It is noted that various non-limiting embodiments described herein may be used separately, combined or selectively combined for specific applications.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the present invention. Numerous modifications and alternative arrangements may be devised by those skilled in the art without departing from the scope of the invention, and the appended claims are intended to cover such modifications and arrangements.

What is claimed is:

1. A method comprising:
    sending, by a network element to a user equipment, precoded reference signals corresponding to a plurality of logical antenna ports with one precoding codeword for each of the plurality of logical antenna ports in order for the user equipment to provide a non-codebook based channel state information feedback report;
    receiving by the network element from the user equipment the non-codebook based channel state information feedback report comprising information on selected one or more of the plurality of logical antenna ports, wherein the user equipment selected without the choosing a precoder, the information comprising one or more of indices r of the selected one or more of the plurality of logical antenna ports and corresponding one or more channel quality indicators for the selected one or more of the plurality of logical antenna ports, wherein the indices r are defined as $$r = \sum_{i=0}^{M-1} \binom{N-s_i}{M-i},$$

where M is a number of selected logical antenna ports, N is a total number of logical antenna ports, i is an index in a summation operation, Si is an index of a selected logical antenna port, and a set $\{S_i\}_{i=0}^{M-1}$, ($1 \le S_i \le N$, $S_i < S_{i+1}$) contains indices of all the M selected logical antenna ports; and
    sending data by the network element to the user equipment using the selected one or more of the plurality of logical antenna ports and the corresponding one precoding codeword for each of the selected one or more of the plurality of logical antenna ports.

2. The method of claim 1, wherein the sending by the network element for the channel state information feedback further comprises sending indication of the indices of the plurality of logical antenna ports, wherein each index of the indices corresponds to one or more of the plurality of logical antenna ports.

3. The method of claim 2, wherein the indices are arranged in one or more tables, where each table comprises indices of a same rank or of different ranks.

4. The method of claim 1, wherein the report does not comprise any codeword.

5. The method of claim 1, wherein the report is received by the network element using multiple messages from the user equipment.

6. The method of claim 1, wherein the indication of indices is sent by the network element using radio resource control signaling.

7. The method of claim 1, wherein if an index of the one or more of the indices has rank equals n, where n is a finite integer of one or more, then the network element receives n channel quality indicators for the n selected logical antenna ports.

8. The method of claim 1, wherein the network element is a base station.

9. The method of claim 1, wherein the one precoding codeword is transparent to the user equipment.

10. A method comprising:
    receiving, from a network element by a user equipment, precoded reference signals corresponding to a plurality of logical antenna ports in order for the user equipment to provide a non-codebook based channel state information feedback report;
    selecting by the user equipment one or more of the plurality of logical antenna ports based on a predefined procedure, wherein the selecting is performed without the user equipment choosing a precoder; and
    sending by the user equipment to the network element the non-codebook based channel state information feedback report comprising information on selected one or more of the plurality of logical antenna ports, the information comprising one or more of indices r of the selected one or more of the plurality of logical antenna ports and corresponding one or more channel quality indicators for the selected one or more of the plurality of logical antenna ports, wherein the indices r are defined as $$r = \sum_{i=0}^{M-1} \binom{N-s_i}{M-i},$$

where M is a number of selected logical antenna ports, N is a total number of logical antenna ports, i is an index in a summation operation, Si is an index of a selected logical antenna port, and a set $\{S_i\}_{i=0}^{M-1}$, ($1 \le S_i \le N$, $S_i < S_{i+1}$) contains indices of all the M selected logical antenna ports.

11. The method of claim 10, wherein before the selecting, the method comprises:
    receiving, from a network element by a user equipment, an indication of indices of the plurality of logical antenna ports, wherein each index of the indices corresponds to one or more of the plurality of logical antenna ports.

12. The method of claim 10, wherein the user equipment does not select or report any codeword.

13. The method of claim 10, wherein the selecting by the user equipment one or more of the plurality of logical antenna ports is based on signal-to-noise ratio or signal to interference plus noise ratio measurements.

14. The method of claim 10, wherein the selecting by the user equipment one or more of the plurality of logical antenna ports is based on an estimated supported modulation and coding scheme or a transport block size.

15. The method of claim 10, wherein the indication of indices is received by the user equipment using radio resource control signaling.

16. The method of claim 10, wherein if an index of the one or more of the indices has rank equals n, where n is a finite integer of one or more, then the network element receives n channel quality indicators for the n selected logical antenna ports.

17. The method of claim 10, wherein the user equipment is a mobile phone, a camera mobile phone, a wireless video phone, a portable device, or a wireless computer.

18. The method of claim 10, wherein the one precoding codeword is transparent to the user equipment.

19. An apparatus comprising:
a processing system comprising at least one processor and a memory storing a set of computer instructions, in which the processing system is configured to cause the apparatus to:
send, to a user equipment, precoded reference signals corresponding to a plurality of logical antenna ports with one precoding codeword for each of the plurality of logical antenna ports in order for the user equipment to provide a non-codebook based channel state information feedback report;
receive from the user equipment the non-codebook based channel state information feedback report comprising information on selected one or more of the plurality of logical antenna ports, wherein the user equipment selected without the choosing a precoder, the information comprising one or more of indices r of the selected one or more of the plurality of logical antenna ports and corresponding one or more channel quality indicators for the selected one or more of the plurality of logical antenna ports, wherein the indices r are defined as $$r = \sum_{i=0}^{M-1} \binom{N-s_i}{M-i},$$

where M is a number of selected logical antenna ports, N is a total number of logical antenna ports, i is an index in a summation operation, Si is an index of a selected logical antenna port, and a set $\{S_i\}_{i=0}^{M-1}$, ($1 \leq S_i \leq N$, $S_i < S_{i+1}$) contains indices of all the M selected logical antenna ports; and send data to the user equipment using the selected one or more of the plurality of logical antenna ports and the corresponding one precoding codeword for each of the selected one or more of the plurality of logical antenna ports.

20. An apparatus comprising:
a processing system comprising at least one processor and a memory storing a set of computer instructions, in which the processing system is configured to cause the apparatus to:
receive, from a network element, precoded reference signals corresponding to a plurality of logical antenna ports in order for the apparatus to provide a non-codebook based channel state information feedback report;
select one or more of the plurality of logical antenna ports based on a predefined procedure, wherein the selecting is performed without the apparatus choosing a precoder; and
send to the network element the non-codebook based channel state information feedback report comprising information on selected one or more of the plurality of logical antenna ports, the information comprising one or more of indices r of the selected one or more of the plurality of logical antenna ports and corresponding one or more channel quality indicators for the selected one or more of the plurality of logical antenna ports, wherein the indices r are defined as $$r = \sum_{i=0}^{M-1} \binom{N-s_i}{M-i},$$

where M is a number of selected logical antenna ports, N is a total number of logical antenna ports, i is an index in a summation operation, Si is an index of a selected logical antenna port, and a set $\{S_i\}_{i=0}^{M-1}$, ($1 \leq S_i \leq N$, $S_i < S_{i+1}$) contains indices of all the M selected logical antenna ports.

* * * * *

UNITED STATES PATENT AND TRADEMARK OFFICE
CERTIFICATE OF CORRECTION

| | | |
|---|---|---|
| PATENT NO. | : 9,059,753 B2 | Page 1 of 1 |
| APPLICATION NO. | : 13/628239 | |
| DATED | : June 16, 2015 | |
| INVENTOR(S) | : Weidong Yang, Timo Erkki Lunttila and Xio Yi Wang | |

It is certified that error appears in the above-identified patent and that said Letters Patent is hereby corrected as shown below:

On the title page, item (73)
Assignee "Nokia Solutions & Networks Oy" should be deleted and --Nokia Solutions and Networks Oy-- should be inserted.

Signed and Sealed this
Twenty-fourth Day of November, 2015

Michelle K. Lee
*Director of the United States Patent and Trademark Office*